United States Patent
Li et al.

(10) Patent No.: US 8,848,033 B2
(45) Date of Patent: Sep. 30, 2014

(54) REGULATING METHOD FOR PANORAMIC IMAGING, APPARATUS FOR THE SAME, AND PANORAMIC IMAGING APPARATUS

(75) Inventors: Jie Li, Zhejiang (CN); Biyong Li, Zhejiang (CN)

(73) Assignee: Puwell Technologies Co., Ltd., Zhejiang (CN)

( * ) Notice: Subject to any disclaimer, the term of this patent is extended or adjusted under 35 U.S.C. 154(b) by 319 days.

(21) Appl. No.: 13/384,486

(22) PCT Filed: Jul. 2, 2010

(86) PCT No.: PCT/CN2010/074899
§ 371 (c)(1),
(2), (4) Date: Jan. 17, 2012

(87) PCT Pub. No.: WO2011/023038
PCT Pub. Date: Mar. 3, 2011

(65) Prior Publication Data
US 2012/0113214 A1    May 10, 2012

(30) Foreign Application Priority Data
Aug. 28, 2009    (CN) .......................... 2009 1 0171549

(51) Int. Cl.
| H04N 5/225 | (2006.01) |
| H04N 7/18 | (2006.01) |
| G03B 37/06 | (2006.01) |
| G02B 13/06 | (2006.01) |

(52) U.S. Cl.
CPC .................. *G03B 37/06* (2013.01); *H04N 7/18* (2013.01); *G02B 13/06* (2013.01)
USPC ......................................... 348/36; 348/207.1

(58) Field of Classification Search
CPC ......... H04N 5/00; H04N 7/00; H04N 5/2259; G03B 37/00; B82Y 10/00
USPC ...................................................... 348/207.1
See application file for complete search history.

(56) References Cited

U.S. PATENT DOCUMENTS

| 5,481,479 | A | 1/1996 | Wight et al. |
| 2004/0169726 | A1* | 9/2004 | Moustier et al. ........... 348/207.1 |
| 2005/0117227 | A1* | 6/2005 | Gal et al. ...................... 359/725 |
| 2007/0097212 | A1 | 5/2007 | Farneman |

FOREIGN PATENT DOCUMENTS

| CN | 1352754 | 6/2002 |
| CN | 101004538 A | 7/2007 |

(Continued)

OTHER PUBLICATIONS

International Search Report of PCT/CN2010/074899 Mailed Nov. 4, 2010, Along With an English Translation.

*Primary Examiner* — Huy T Nguyen

(74) *Attorney, Agent, or Firm* — Venable LLP; Robert Kinberg

(57) ABSTRACT

A regulating method for panoramic imaging, a regulating apparatus for the same, and a panoramic imaging apparatus are provided. The method includes: determining the circular viewing angle and the pitch angle of the current zone which is ready for being detected, determining the side length of the rectangular imaging part in the panoramic imaging apparatus, regulating the round panoramic image in the focal plane formed by a panoramic lens according to the side length of the rectangular imaging part and the circular viewing angle and the pitch angle of the current zone which is ready for being detected, in order to make the diameter of the round panoramic image in the focal plane formed by the panoramic lens greater than the length of the shorter side of the rectangular imaging part.

12 Claims, 6 Drawing Sheets

(56) References Cited

FOREIGN PATENT DOCUMENTS

| CN | 101042525 A | 9/2007 |
| CN | 101119482 | 2/2008 |
| CN | 101256275 A | 9/2008 |
| CN | 101521745 | 9/2009 |
| CN | 101930161 A | 12/2010 |

* cited by examiner

S301: determine a horizontal angle of view and a vertical angle of view of a current range to be monitored S302: determine side lengths of a rectangular-shaped imaging device of the panoramic imaging apparatus S303: adjust a circular panoramic image formed at the focal plane of a panoramic lens according to the side lengths of the rectangular-shaped imaging device and the horizontal angle of view and the vertical angle of view of the current range to be monitored, so that the diameter of the circular panoramic image formed at the focal plane of the panoramic lens is larger than the shorter side length of the rectangular-shaped imaging device S304: adjust a relative position between the panoramic lens and the rectangular-shaped imaging device by moving the panoramic lens or the rectangular-shaped imaging device along the direction of the optical axis of the panoramic lens according to the side lengths of the rectangular-shaped imaging device and the horizontal angle of view and the vertical angle of view of the current range to be monitored, so that the rectangular-shaped imaging device is positioned at the focal plane of the panoramic lens S305: adjust a relative position between the panoramic lens and the rectangular-shaped imaging device at a plane that is perpendicular to the optical axis of the panoramic lens according to the side lengths of the rectangular-shaped imaging device and the horizontal angle of view and the vertical angle of view of the current range to be monitored, so that the geometric center of the rectangular-shaped imaging device is away from the optical axis of the panoramic len

REGULATING METHOD FOR PANORAMIC IMAGING, APPARATUS FOR THE SAME, AND PANORAMIC IMAGING APPARATUS

The present application is a National Phase application of PCT Application No. PCT/CN2010/074899, filed on Jul. 2, 2010 and titled "REGULATING METHOD FOR PANORAMIC IMAGING, APPARATUS FOR THE SAME, AND PANORAMIC IMAGING APPARATUS," which claims the benefit of Chinese patent application No. 200910171549.6 filed with the State Intellectual Property Office on Aug. 28, 2009, which together with the PCT application are incorporated herein by reference in their entireties.

FIELD OF THE INVENTION

The present invention relates to the field of video surveillance technology, and in particular to an adjustment method for panoramic imaging and an apparatus thereof, and panoramic imaging apparatuses.

BACKGROUND OF THE INVENTION

An existing panoramic surveillance apparatus generally includes a panoramic lens and a charge-coupled device (CCD)/complementary metal-oxide semiconductor (CMOS) imaging assembly. The panoramic surveillance apparatus sends an analog video output signal to a panoramic video server, which then transmits converted images to a surveillance room or directly to a monitor for display. A panoramic camera is a newly-developed panoramic surveillance apparatus, which is able to provide 360-degree wide range surveillance with no blind spots, eliminating the need for multiple cameras. FIG. 1 is a structural diagram illustrating a method in the prior art of 360-degree horizontal angle of view panoramic imaging. As shown in FIG. 1, an imaging device 102 is positioned at the focal plane 104 of a panoramic imaging lens, and the optical axis 103 of the panoramic imaging lens 101 passes through the geometric center of the imaging device 102.

The inventors found that the method in the prior art has a disadvantage that in the case where the vertical angles of view are equal and the horizontal angle of view is less than 360 degrees, too much useless information is generated and the utilization rate of pixels is relatively low.

SUMMARY OF THE INVENTION

In view of the foregoing, an object of an embodiment of the present invention is to provide an adjustment method for panoramic imaging and an apparatus thereof, and a panoramic imaging apparatus, in order to improve the utilization rate of pixels of an imaging device in the case where the vertical angles of view are equal and the horizontal angle of view is less than 360 degrees.

In order to achieve the object above, according to an embodiment of the present invention it is provided the following technical solutions:

An adjustment method for panoramic imaging is provided, wherein the method is applied to a panoramic imaging apparatus, and the method includes:

determining a horizontal angle of view and a vertical angle of view of a current range to be monitored;

determining side lengths of a rectangular-shaped imaging device of the panoramic imaging apparatus; and adjusting a circular panoramic image formed at the focal plane of a panoramic lens according to the side lengths of the rectangular-shaped imaging device and the horizontal angle of view and the vertical angle of view of the current range to be monitored, so that the diameter of the circular panoramic image formed at the focal plane of the panoramic lens is larger than the shorter side length of the rectangular-shaped imaging device.

The method above may further include:

adjusting a relative position between the panoramic lens and the rectangular-shaped imaging device by moving the panoramic lens or the rectangular-shaped imaging device along the direction of the optical axis of the panoramic lens according to the side lengths of the rectangular-shaped imaging device and the horizontal angle of view and the vertical angle of view of the current range to be monitored, so that the rectangular-shaped imaging device is positioned at the focal plane of the panoramic lens.

The method above may further include:

adjusting a relative position between the panoramic lens and the rectangular-shaped imaging device at a plane that is perpendicular to the optical axis of the panoramic lens according to the side lengths of the rectangular-shaped imaging device and the horizontal angle of view and the vertical angle of view of the current range to be monitored, so that the geometric center of the rectangular-shaped imaging device is away from the optical axis of the panoramic lens.

The step of adjusting the relative position between the panoramic lens and the rectangular-shaped imaging device may include:

moving the panoramic lens or the rectangular-shaped imaging device along the direction of the longer side length of the rectangular-shaped imaging device.

The step of adjusting the relative position between the panoramic lens and the rectangular-shaped imaging device may include:

moving the panoramic lens or the rectangular-shaped imaging device along the direction of the shorter side length of the rectangular-shaped imaging device.

It is also provided an adjustment apparatus for panoramic imaging, including:

a first determination unit, configured to determine a horizontal angle of view and a vertical angle of view of a current range to be monitored;

a second determination unit, configured to determine side lengths of a rectangular-shaped imaging device of a panoramic imaging apparatus; and a first adjustment unit, configured to adjust a circular panoramic image formed at the focal plane of a panoramic lens according to the side lengths of the rectangular-shaped imaging device and the horizontal angle of view and the vertical angle of view of the current range to be monitored, so that the diameter of the circular panoramic image formed at the focal plane of the panoramic lens is larger than the shorter side length of the rectangular-shaped imaging device.

The adjustment apparatus above may further include:

a second adjustment unit, configured to adjust a relative position between the panoramic lens and the rectangular-shaped imaging device by moving the panoramic lens or the rectangular-shaped imaging device along the direction of the optical axis of the panoramic lens, so that the rectangular-shaped imaging device is positioned at the focal plane of the panoramic lens.

The adjustment apparatus above may further include:

a third adjustment unit, configured to adjust a relative position between the panoramic lens and the rectangular-shaped imaging device at a plane that is perpendicular to the optical axis of the panoramic lens according to the side lengths of the rectangular-shaped imaging device and the horizontal angle of view and the vertical angle of view of the current range to be monitored, so that the geometric center of the rectangular-shaped imaging device is away from the optical axis of the panoramic lens.

In particular, the third adjustment unit may be configured to adjust the relative position between the panoramic lens and the rectangular-shaped imaging device by moving the panoramic lens or the rectangular-shaped imaging device along the direction of the longer side length of the rectangular-shaped imaging device.

In particular, the third adjustment unit may be configured to adjust the relative position between the panoramic lens and the rectangular-shaped imaging device by moving the panoramic lens or the rectangular-shaped imaging device along the direction of the shorter side length of the rectangular-shaped imaging device.

It is also provided a panoramic imaging apparatus, including a panoramic lens and an imaging device, wherein the diameter of a circular panoramic image formed at the focal plane of the panoramic lens is larger than the shorter side length of the rectangular-shaped imaging device.

The panoramic imaging apparatus above may further include:

the geometric center of the rectangular-shaped imaging device is away from the optical axis of the panoramic lens.

Therefore, according to the embodiments of the present invention, the diameter of a circular panoramic image formed at the focal plane of a panoramic lens of a panoramic imaging apparatus is detected; the shorter side length of a rectangular-shaped imaging device of the panoramic imaging apparatus is determined; the largest horizontal angle of view of a current range to be monitored is determined; and the circular panoramic image formed at the focal plane of the panoramic lens is adjusted according to the shorter side length of the rectangular-shaped imaging device and the largest horizontal angle of view of the current range to be monitored, so that the diameter of the circular panoramic image formed at the focal plane of the panoramic lens is larger than the shorter side length of the rectangular-shaped imaging device. By using the method according to the embodiments of the present invention, the utilization rate of pixels of the imaging device in the case where the vertical angles of view are equal and the horizontal angle of view is less than 360 degrees is effectively improved, and imaging quality is enhanced.

BRIEF DESCRIPTION OF THE FIGURES

FIG. 3 is a flow chart of a method according to an embodiment of the present invention;

DETAILED DESCRIPTION OF THE EMBODIMENTS

It is disclosed according to the embodiments of the present invention an adjustment method for panoramic imaging and an apparatus thereof, and a panoramic imaging apparatus. For a better understanding of the objects, technical solutions and advantages of the present invention, the present invention will be described hereinafter in detail in conjunction with the accompanying drawings and the exemplary embodiments.

Figure 1:
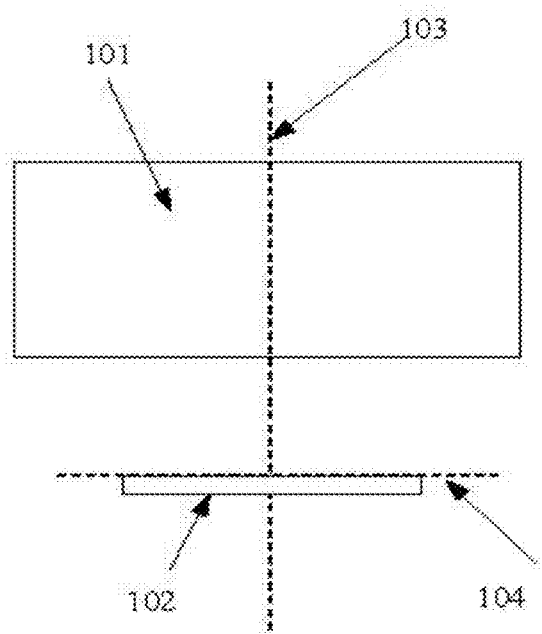
FIG. 1 is a structural diagram illustrating a method of panoramic imaging in the prior art.

As shown in FIG. 1, a structural diagram illustrating a method of panoramic imaging in the prior art, an imaging device 102 is positioned at the focal plane 104 of a panoramic lens 101, and the optical axis 103 of the panoramic lens 101 passes through the geometric center of the imaging device 102.

The panoramic lens in the embodiment of the present invention may be a "Catadioptric Omni-directional Imaging System" as known in the art. The panoramic lenses described in the following embodiments may have the same meaning, and detailed descriptions will be omitted.

The method of panoramic imaging in the prior art is designed to provide an imaging capability with a 360-degree horizontal angle of view and equal vertical angles of view, while obtaining the largest resolution of an image formed by a predetermined imaging device.

A panoramic image formed at the focal plane of a panoramic lens is circular, and the shape of an imaging device is generally rectangular. In order to provide an imaging capability with a 360-degree horizontal angle of view and equal vertical angles of view, the diameter of circular panoramic images formed by a panoramic lens has to be not larger than the shorter side length of the rectangular-shaped imaging device. Moreover, in order to obtain the largest resolution of images formed by a predetermined imaging device, the diameter of the circular panoramic images formed by the panoramic lens is designed to be equal to the shorter side length of the rectangular-shaped imaging device. Hence, the outer circle of a panoramic image is tangent to both of the longer sides of the rectangular-shaped imaging device.

In practice, however, it is not always necessary to pay attention to the 360-degree horizontal angle of view space. When the horizontal angle of view of a concerned space is less than 360 degrees or when the vertical angles of view of a concerned space are not spherical symmetric, hence, when the concerned space corresponds to only a portion of the circular panoramic image, the solution of panoramic imaging in the prior art makes no actual use of pixels of the image of an unconcerned space.

Figure 2:
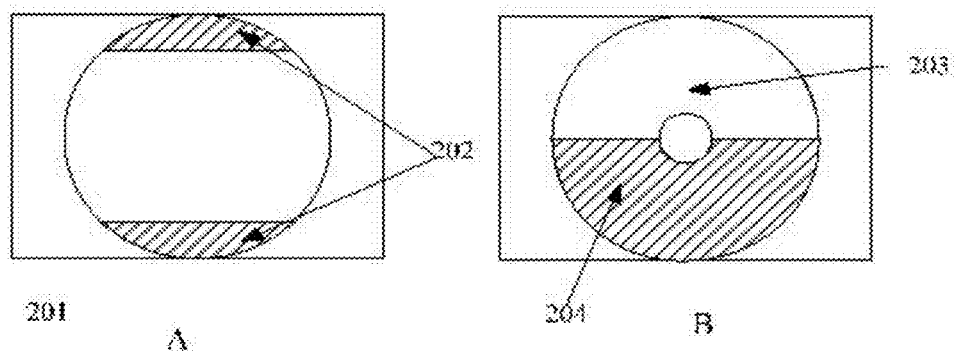
FIG. 2 is a schematic diagram illustrating the method of panoramic imaging in the prior art with a scene.

For example, when a panoramic imaging apparatus is used to image a long and narrow space, what is concerned is a portion 201 (as shown in FIG. 2A). In the length direction of the space, a large vertical angle of view is not necessary, for example, above and under the portion 201, i.e., portions 202 as shown in FIG. 2A. Hence, the portions 202 as shown in FIG. 2A are the images of unconcerned spaces.

As another example, a panoramic imaging apparatus is mounted onto a wall, and what is concerned is the image of the 180-degree horizontal angle of view space outside the wall, e.g., a portion 203 as shown in FIG. 2B, but not the 180-degree horizontal angle of view space corresponding to the wall itself, e.g., a portion 204 as shown in FIG. 2B. Hence, the portion 204 as shown in FIG. 2B is the image of an unconcerned space.

In the two examples above, if the solution of panoramic imaging in the prior art is applied, the pixels of the portions 202 and 204 are not made actual use of, thereby reducing the utilization rate of the whole imaging device.

To solve the problems above, it is provided according to an embodiment of the present invention an adjustment method for panoramic imaging. As shown in FIG. 3, the method includes the following steps:

S301, a horizontal angle of view and a vertical angle of view of a current range to be monitored are determined.

For a better understanding of the present invention, the concepts of "horizontal angle of view" and "vertical angle of view" are explained below with reference to the accompanying figure.

Figure 4:
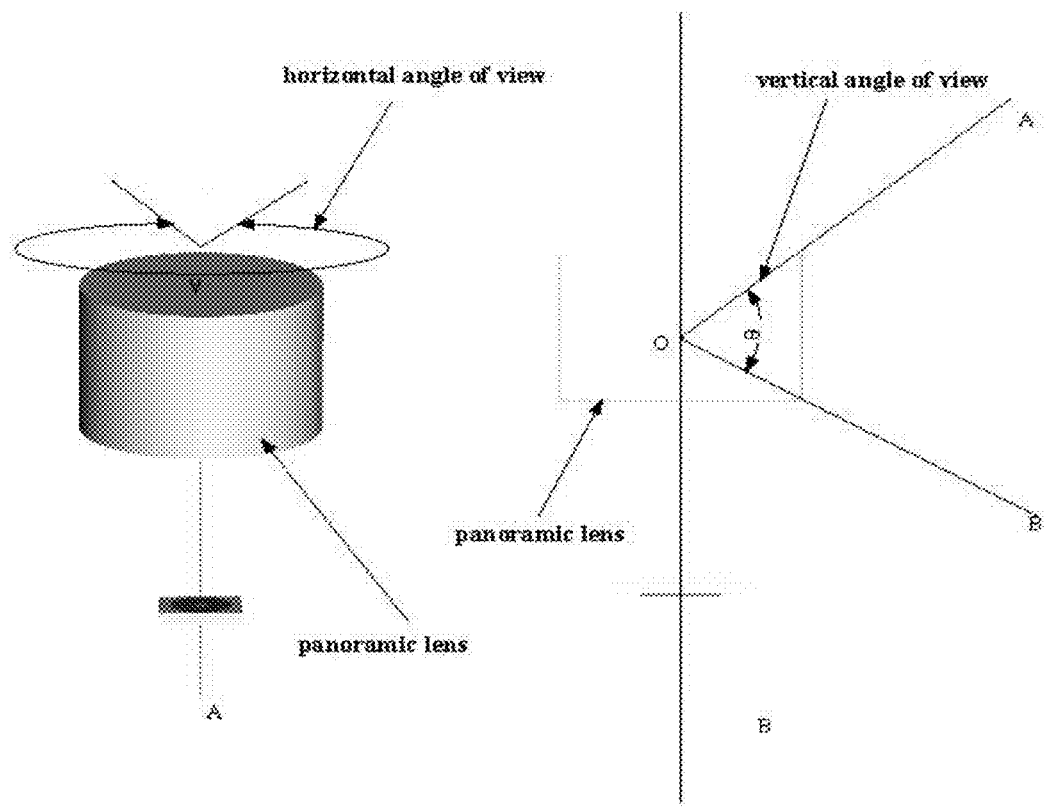
FIG. 4 is a schematic diagram illustrating two concepts in a method according to an embodiment of the present invention.

As shown in FIG. 4A, a horizontal angle of view is a field of view in a plane that is perpendicular to the optical axis of a panoramic lens, and a vertical angle of view is a field of view in a plane that passes through the optical axis of the panoramic lens.

By determining the horizontal angle of view and the vertical angle of view of the current range to be monitored, the scope of concerned spots in the current range to be monitored is effectively determined.

S302, side lengths of a rectangular-shaped imaging device of the panoramic imaging apparatus are determined.

Generally, a rectangular-shaped imaging device includes a shorter side length and a longer side length; particularly when the rectangular-shaped imaging device is square-shaped, the shorter side length equals to the longer side length, and only one of the side lengths needs to be determined.

S303, a circular panoramic image formed at the focal plane of a panoramic lens is adjusted according to the side lengths of the rectangular-shaped imaging device and the horizontal angle of view and the vertical angle of view of the current range to be monitored, so that the diameter of the circular panoramic image formed at the focal plane of the panoramic lens is larger than the shorter side length of the rectangular-shaped imaging device.

Particularly, when the rectangular-shaped imaging device is square-shaped, the diameter of the circular panoramic image formed at the focal plane of the panoramic lens may be larger than any one of the side lengths of the rectangular-shaped imaging device.

The sequencing of step S301 and step S302 is not limited, as long as the parameters can be obtained.

Figure 5:
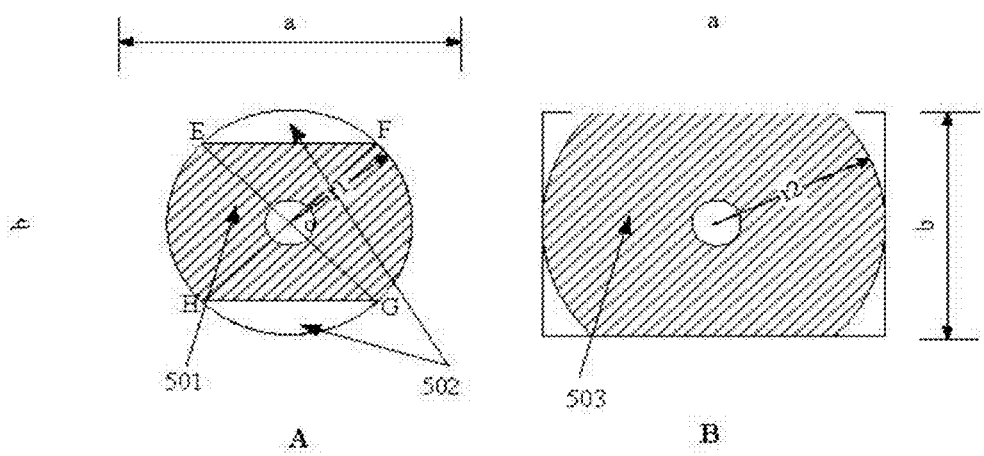
FIG. 5 is a schematic diagram illustrating a method according to an embodiment of the present invention with a scene where the method is applied.

FIG. 5 is a schematic diagram illustrating a method according to an embodiment of the present invention with a scene where the method is applied. In this scene, what is concerned is a portion 501 as shown in FIG. 5A. As a matter of course, the portion 501 is only part of the 360-degree panoramic image. As shown in FIG. 5B, the diameter of the circular panoramic image formed at the focal plane of the panoramic lens is enlarged to be equal to the longer side length of the rectangular-shaped imaging device according to the method provided by the embodiment of the present invention. In particular, in FIG. 5A, each of sectors OEH and OFG of the portion 501 corresponds to a range having equal vertical angles of view in the horizontal angle of view directions, the value of the vertical angles of view being θ. However, each of triangles EOF and HOG corresponds to a range having unequal vertical angles of view in the horizontal angle of view directions, the value of the vertical angles of view being less than θ. The image of an unconcerned space is a portion 502. As shown in FIG. 5B, the diameter of the circular panoramic image of FIG. 5A is adjusted to be equal to the longer side length of the rectangular-shaped imaging device, so that the image of the unconcerned space represented by the portion 502 of FIG. 5A is moved out of the imaging device of FIG. 5B. The portions 503 and 501 correspond to the same space, but the portion 503 has a higher resolution because more pixels on the imaging device are used.

By using the method according to the embodiment of the present invention, the diameter of a circular panoramic image formed at the focal plane of a panoramic lens is adjusted according to a horizontal angle of view and a vertical angle of view of a current range to be monitored, so that the image of an unconcerned space is removed from an imaging device, resulting more pixels on the imaging device for a concerned space, thereby providing a better imaging quality.

According to another embodiment of the present invention, the method as shown in FIG. 3 may further includes the following step:

S304, a relative position between the panoramic lens and the rectangular-shaped imaging device is adjusted by moving the panoramic lens or the rectangular-shaped imaging device along the direction of the optical axis of the panoramic lens according to the side lengths of the rectangular-shaped imaging device and the horizontal angle of view and the vertical angle of view of the current range to be monitored, so that the rectangular-shaped imaging device is positioned at the focal plane of the panoramic lens.

Optionally, according to another embodiment of the present invention, the method as shown in FIG. 3 may further includes the following step:

S305, a relative position between the panoramic lens and the rectangular-shaped imaging device is adjusted at a plane that is perpendicular to the optical axis of the panoramic lens according to the side lengths of the rectangular-shaped imaging device and the horizontal angle of view and the vertical angle of view of the current range to be monitored, so that the geometric center of the rectangular-shaped imaging device is away from the optical axis of the panoramic lens.

In particular, the step of adjusting the relative position between the panoramic lens and the rectangular-shaped imaging device may include:

moving the panoramic lens or the rectangular-shaped imaging device along the direction of the longer side length of the rectangular-shaped imaging device; or moving the panoramic lens or the rectangular-shaped imaging device along the direction of the shorter side length of the rectangular-shaped imaging device.

Thus, by using the methods above, the relative position between the optical axis and the imaging device can be adjusted along the direction of the optical axis or at a plane that is perpendicular to the optical axis.

Figure 6:
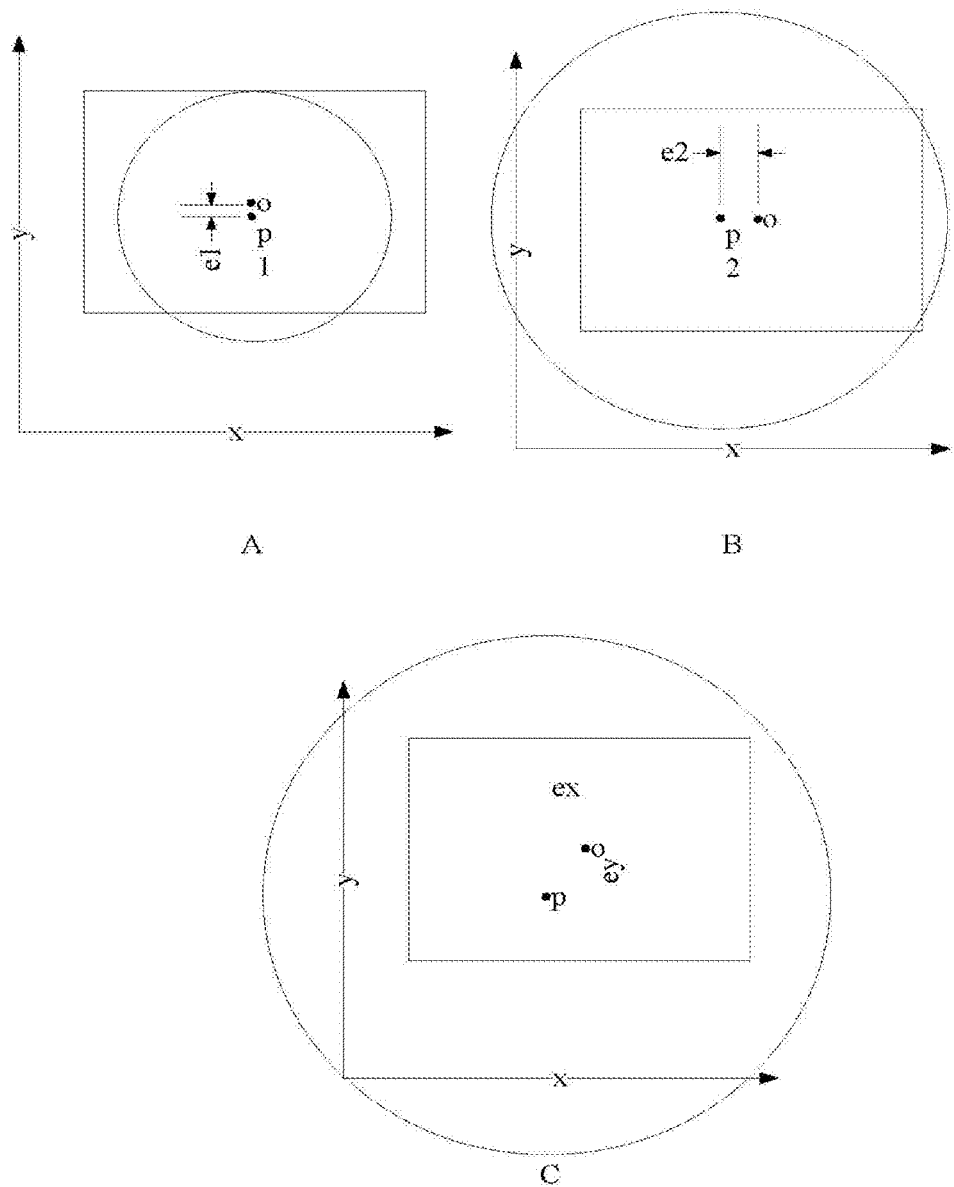
FIG. 6 is a schematic diagram illustrating a method according to an embodiment of the present invention with a scene corresponding to the method.

FIG. 6 illustrates adjusting the relative positional relationship between the geometric center of the rectangular-shaped imaging device and the optical axis at a plane that is perpendicular to the optical axis according to a method provided by an embodiment of the present invention. For illustrative purposes, in the following description, the relative positional relationship between the geometric center of the rectangular-shaped imaging device and the optical axis will be described below with the optical axis being the reference as the rectangular-shaped imaging device moves.

The relative positional relationship between the geometric center of the rectangular-shaped imaging device and the optical axis may have three forms, which are shown in FIGS. 6A, 6B and 6C, respectively.

In FIG. 6A, O is the center of the rectangular-shaped imaging device, and p1 is a projection of the optical axis in the circular projected image. As shown in FIG. 6A, the imaging device is away from the optical axis in the direction of y-axis (i.e., the direction of the shorter side length of the rectangular-shaped imaging device), with a distance of e1.

In FIG. 6B, O is the center of the rectangular-shaped imaging device, and p2 is a projection of the optical axis in the circular projected image. As shown in FIG. 6B, the imaging device is away from the optical axis in the direction of x-axis (i.e., the direction of the longer side length of the rectangular-shaped imaging device), with a distance of e2.

In FIG. 6C, O is the center of the rectangular-shaped imaging device, and p is a projection of the optical axis in the circular projected image. As shown in FIG. 6C, the imaging device is away from the optical axis in both the direction of x-axis (i.e., the direction of the longer side length of the rectangular-shaped imaging device) and the direction of y-axis (i.e., the direction of the shorter side length of the rectangular-shaped imaging device), with distances ex and ey, respectively.

Figure 7:
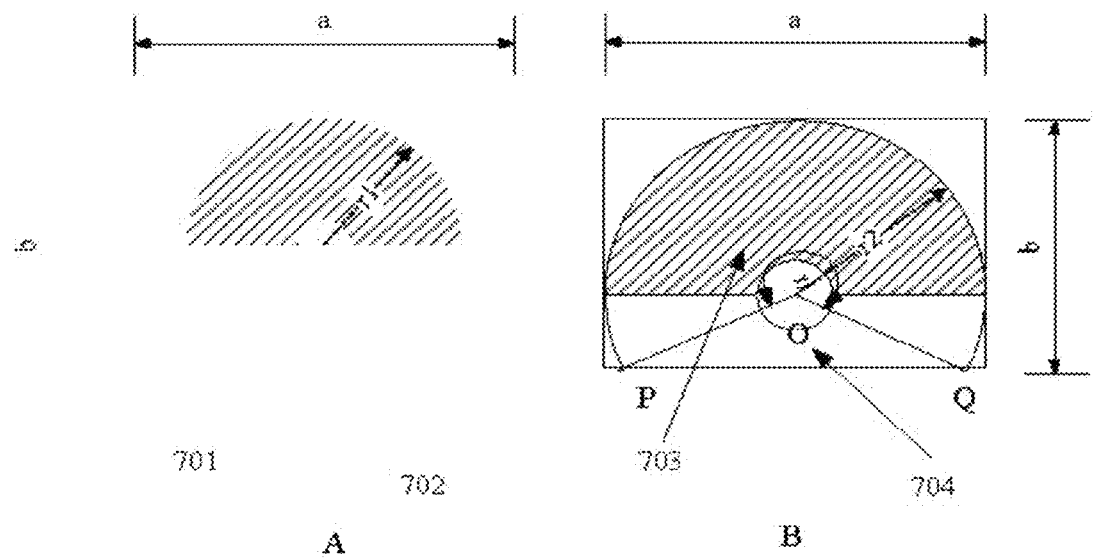
FIG. 7 is a schematic diagram illustrating a method according to an embodiment of the present invention with a scene where the method is applied.

Referring to FIG. 7, a method according to an embodiment of the present invention is described in which the arrangement as shown in FIG. 6A is used and a concerned space having a 180-degree horizontal angle of view is taken as an example.

As shown in FIGS. 7A and 7B, the longer side length of the rectangular-shaped imaging device is a, and the number of pixels is m. The shorter side length of the rectangular-shaped imaging device is b, and the number of pixels is n. As shown in FIG. 7A, of the image formed at an imaging device of a panoramic imaging apparatus designed according to a conventional method, a portion 701 is the image of a concerned space having a 180-degree horizontal angle of view.

$$r1 = \frac{b}{2},$$

the number of pixels (or area) of the imaging device corresponding to the portion 701 is $$S_A = \frac{\pi b^2}{8} \cdot mn,$$

and the vertical angles of view in all the horizontal angle of view directions are equal, i.e., it is an equal-vertical angle of view system, the value of the vertical angles of view being θ.

FIG. 7B shows the image formed at an imaging device of a panoramic imaging apparatus designed according to the method provided by the embodiment of the present invention. A portion 703 is the image of a presumably concerned space having a 180-degree horizontal angle of view, $$r2 = \frac{a}{2},$$

and the number of pixels (or area) of the imaging device corresponding to the portion 703 is $$S_B = \frac{\pi a^2}{8} \cdot mn.$$

A sector QOP corresponds to a range having equal vertical angles of view in the horizontal angle of view directions, the value of the vertical angles of view being θ as shown in the system of FIG. 7A. A triangle QOP corresponds to a range having unequal vertical angles of view in the horizontal angle of view directions, the value of the vertical angles of view being less than θ. The vertical angles of view of the range corresponding to the sector QOP are $$\alpha = 2\arccos\left(1 - \frac{2b}{a}\right).$$

In practice, rectangular-shaped imaging devices of different sizes may have different values of the horizontal angle of view, for example, if r2=a/2, and the rectangular-shaped imaging device has a:b=4:3, then α=240°;

if r2=a/2, and the rectangular-shaped imaging device has a:b=16:9, then α≈194°.

By comparison between FIG. 7A and FIG. 7B, a>b, then $S_B>S_A$, hence, the portions 701 and 703 correspond to the same space, but the apparatus corresponding to FIG. 7B has a higher resolution of the panorama imaging system than the apparatus corresponding to FIG. 7A because the portion 703 uses more pixels on the imaging device than the portion 701.

By synthetically adjusting the geometric center of an imaging device and the diameter of a circular panoramic image formed at the focal plane of a panoramic lens, the method according to the embodiment of the present invention can flexibly remove the image of an unconcerned space from the imaging device according to the largest horizontal angle of view of a current range to be monitored, resulting more pixels on the imaging device for a concerned space, thereby providing a better imaging quality.

Figure 8:
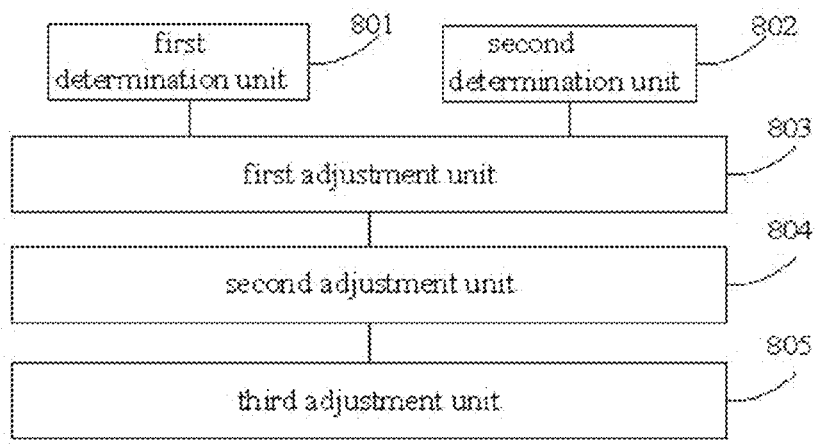
FIG. 8 is a structural diagram of an apparatus according to an embodiment of the present invention.

Corresponding to the method embodiments, referring to FIG. 8, it is also provided according to an embodiment of the present invention an adjustment apparatus for panoramic imaging, including:

a first determination unit 801, configured to determine a horizontal angle of view and a vertical angle of view of a current range to be monitored;

a second determination unit 802, configured to determine side lengths of a rectangular-shaped imaging device of a panoramic imaging apparatus; and a first adjustment unit 803, configured to adjust a circular panoramic image formed at the focal plane of a panoramic lens according to the side lengths of the rectangular-shaped imaging device and the horizontal angle of view and the vertical angle of view of the current range to be monitored, so that the diameter of the circular panoramic image formed at the focal plane of the panoramic lens is larger than the shorter side length of the rectangular-shaped imaging device.

According to another embodiment of the present invention, the adjustment apparatus may further include:

a second adjustment unit 804, configured to adjust a relative position between the panoramic lens and the rectangular-shaped imaging device by moving the panoramic lens or the rectangular-shaped imaging device along the direction of the optical axis of the panoramic lens, so that the rectangular-shaped imaging device is positioned at the focal plane of the panoramic lens.

Optionally, according to another embodiment of the present invention, the adjustment apparatus as shown in FIG. 8 may further include:

a third adjustment unit 805, configured to adjust a relative position between the panoramic lens and the rectangular-shaped imaging device at a plane that is perpendicular to the optical axis of the panoramic lens according to the side lengths of the rectangular-shaped imaging device and the horizontal angle of view and the vertical angle of view of the current range to be monitored, so that the geometric center of the rectangular-shaped imaging device is away from the optical axis of the panoramic lens.

In particular, the second adjustment unit may be configured to adjust the relative position between the panoramic lens and the rectangular-shaped imaging device by moving the panoramic lens or the rectangular-shaped imaging device along the direction of the longer side length of the rectangular-shaped imaging device; or, by moving the panoramic lens or the rectangular-shaped imaging device along the direction of the shorter side length of the rectangular-shaped imaging device.

Alternatively, according to another embodiment of the present invention, the adjustment apparatus as shown in FIG. 8 may further include: a third adjustment unit 805, configured to adjust a relative position between the panoramic lens and the rectangular-shaped imaging device by moving the panoramic lens or the rectangular-shaped imaging device along the direction of the optical axis of the panoramic lens, so that the rectangular-shaped imaging device is positioned at the focal plane of the panoramic lens.

The second adjustment unit and the third adjustment unit can realize flexible adjustment of the relative positional relationship between the panoramic lens and the rectangular-shaped imaging device.

It is also provided according to another embodiment of the present invention a panoramic imaging apparatus, including a panoramic lens and an imaging device, wherein the diameter of a circular panoramic image formed at the focal plane of the panoramic lens is larger than the shorter side length of the rectangular-shaped imaging device.

Furthermore, the geometric center of the rectangular-shaped imaging device may be away from the optical axis of the panoramic lens.

Figure 9:
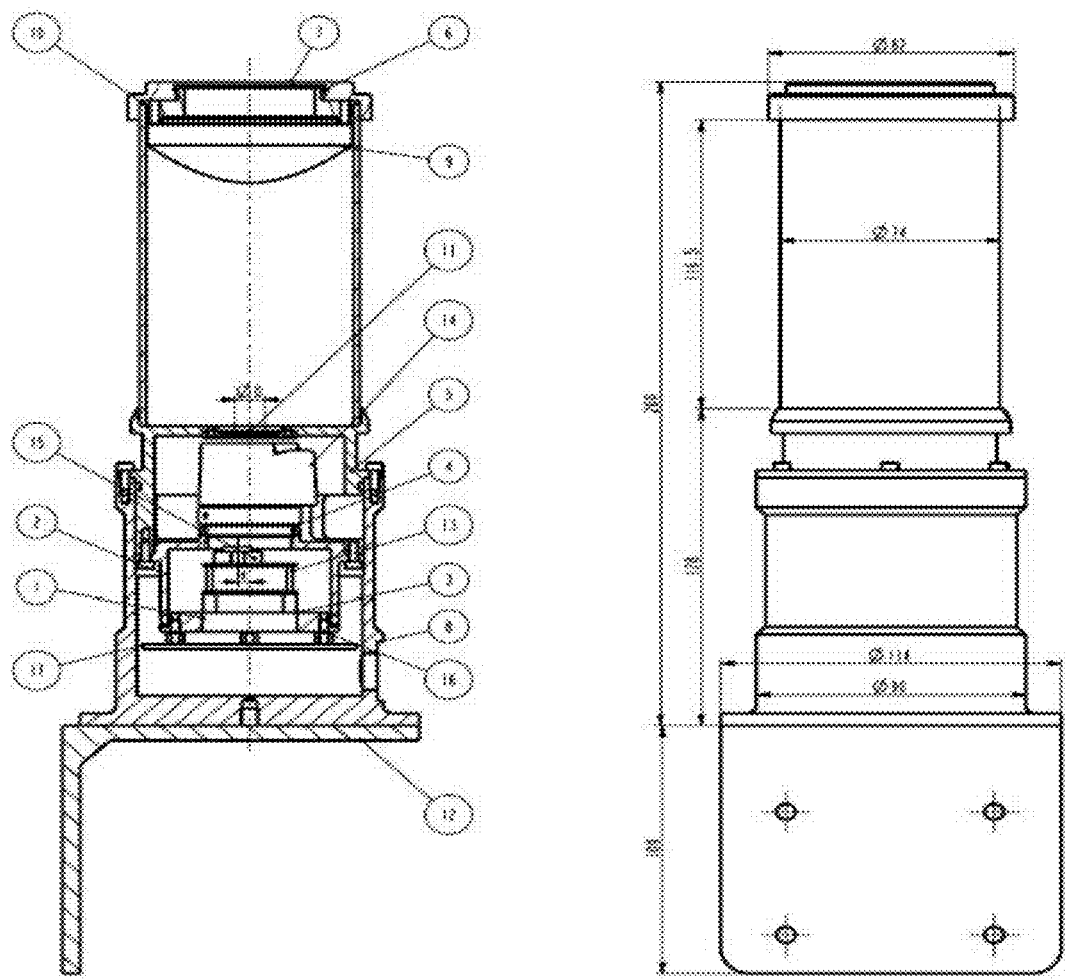
FIG. 9 is a structural diagram of an apparatus according to another embodiment of the present invention.

FIG. 9 is a structural diagram of a panorama imaging apparatus according to an embodiment of the present invention. Reference numeral 9 represents a reflector including a quadratic rotary surface, and the reflector is fixedly connected to a transparent cylinder 10 via an upper cover 6. Reference numeral 7 represents an outer cover, for water protection of the top of the transparent cylinder 10. The bottom of the transparent cylinder 10 is fixedly connected to a fixing base 5. The transparent cylinder 10 is fixedly connected with both the fixing base 5 and the outer cover 7, by ultraviolet-curing adhesive bonding. The fixing base 5 is connected to a base 8 through screw threads, with a cavity formed therebetween. A diaphragm 11 is mounted at the lower surface of the fixing base 5, in order to reduce affection on imaging quality by stray light reflected by the inner and outer surfaces of the transparent cylinder. A lens 14 is a commercially available lens, with a C or CS interface, and has optical parameters such as aperture and focal length complying with design requirements of the system. The lens 14 is fixedly connected on a lens seat 2. Reference numeral 13 represents a CCD or CMOS camera, which is fixedly connected to the other end of the lens seat 2 via a keyset 1. With the adjustment apparatus for panoramic imaging according to the embodiment of the present invention, the diameter of a circular panoramic image can be changed by adjusting the vertical position and the focal length of the lens 14. And by adjusting an imaging device 15 with the adjustment apparatus for panoramic imaging according to the embodiment of the present invention, the imaging device 15 can be positioned at the focal plane of the panoramic lens, with an offset e along the imaging device between the geometric center of the imaging device and the optical axis.

The imaging apparatus including the components above may be fixedly mounted onto a vertical surface via a bracket 12, to perform imaging of a space outside the vertical surface.

Preferred embodiments of the present invention are described above. It is noted that, those skilled in the art may make improvements and modifications without deviation from the principle of the present invention, and those improvements and modifications should fall within the scope of protection of the present invention.

What is claimed is:

1. An adjustment method for panoramic imaging, wherein the method is applied to a panoramic imaging apparatus, and the method comprises:
   determining a horizontal angle of view and a vertical angle of view of a current range to be monitored;
   determining side lengths of a rectangular-shaped imaging device of the panoramic imaging apparatus; and
   adjusting a circular panoramic image formed at a focal plane of a panoramic lens according to the side lengths of the rectangular-shaped imaging device and the horizontal angle of view and the vertical angle of view of the current range to be monitored, so that a diameter of the circular panoramic image formed at the focal plane of the panoramic lens is larger than the shorter side length of the rectangular-shaped imaging device.

2. The method according to claim 1, further comprising:
   adjusting a relative position between the panoramic lens and the rectangular-shaped imaging device by moving the panoramic lens or the rectangular-shaped imaging device along the direction of an optical axis of the panoramic lens according to the side lengths of the rectangular-shaped imaging device and the horizontal angle of view and the vertical angle of view of the current range to be monitored, so that the rectangular-shaped imaging device is positioned at the focal plane of the panoramic lens.

3. The method according to claim 1, further comprising:
   adjusting a relative position between the panoramic lens and the rectangular-shaped imaging device at a plane that is perpendicular to an optical axis of the panoramic lens according to the side lengths of the rectangular-shaped imaging device and the horizontal angle of view and the vertical angle of view of the current range to be monitored, so that a geometric center of the rectangular-shaped imaging device is away from the optical axis of the panoramic lens.

4. The method according to claim 3, wherein the adjusting of the relative position between the panoramic lens and the rectangular-shaped imaging device comprises:
   moving the panoramic lens or the rectangular-shaped imaging device along the direction of the longer side length of the rectangular-shaped imaging device.

5. The method according to claim 3, wherein the adjusting of the relative position between the panoramic lens and the rectangular-shaped imaging device comprises:
   moving the panoramic lens or the rectangular-shaped imaging device along the direction of the shorter side length of the rectangular-shaped imaging device.

6. An adjustment apparatus for panoramic imaging, comprising:
   a first determination unit, configured to determine a horizontal angle of view and a vertical angle of view of a current range to be monitored;
   a second determination unit, configured to determine side lengths of a rectangular-shaped imaging device of a panoramic imaging apparatus; and a first adjustment unit, configured to adjust a circular panoramic image formed at a focal plane of a panoramic lens according to the side lengths of the rectangular-shaped imaging device and the horizontal angle of view and the vertical angle of view of the current range to be monitored, so that a diameter of the circular panoramic image formed at the focal plane of the panoramic lens is larger than the shorter side length of the rectangular-shaped imaging device.

7. The apparatus according to claim 6, further comprising:
a second adjustment unit, configured to adjust a relative position between the panoramic lens and the rectangular-shaped imaging device by moving the panoramic lens or the rectangular-shaped imaging device along the direction of an optical axis of the panoramic lens, so that the rectangular-shaped imaging device is positioned at the focal plane of the panoramic lens.

8. The apparatus according to claim 6, further comprising:
a third adjustment unit, configured to adjust a relative position between the panoramic lens and the rectangular-shaped imaging device at a plane that is perpendicular to an optical axis of the panoramic lens according to the side lengths of the rectangular-shaped imaging device and the horizontal angle of view and the vertical angle of view of the current range to be monitored, so that a geometric center of the rectangular-shaped imaging device is away from the optical axis of the panoramic lens.

9. The apparatus according to claim 8, wherein the third adjustment unit is configured to adjust the relative position between the panoramic lens and the rectangular-shaped imaging device by moving the panoramic lens or the rectangular-shaped imaging device along the direction of the longer side length of the rectangular-shaped imaging device.

10. The apparatus according to claim 8, wherein the third adjustment unit is configured to adjust the relative position between the panoramic lens and the rectangular-shaped imaging device by moving the panoramic lens or the rectangular-shaped imaging device along the direction of the shorter side length of the rectangular-shaped imaging device.

11. A panoramic imaging apparatus, comprising a panoramic lens, adjustment apparatus for panoramic imaging, and a rectangular-shaped imaging device, wherein a diameter of a circular panoramic image formed at a focal plane of the panoramic lens is larger than the shorter side length of the rectangular-shaped imaging device, and the adjustment apparatus for panoramic imaging comprises:
a first determination unit, configured to determine a horizontal angle of view and a vertical angle of view of a current range to be monitored;
a second determination unit, configured to determine side lengths of the rectangular-shaped imaging device of the panoramic imaging apparatus; and
a first adjustment unit, configured to adjust a circular panoramic image formed at a focal plane of the panoramic lens according to the side lengths of the rectangular-shaped imaging device and the horizontal angle of view and the vertical angle of view of the current range to be monitored, so that a diameter of the circular panoramic image formed at the focal plane of the panoramic lens is larger than the shorter side length of the rectangular-shaped imaging device.

12. The apparatus according to claim 11, wherein:
the geometric center of the rectangular-shaped imaging device is away from the optical axis of the panoramic lens.

* * * * *